United States Patent
Brandenburg et al.

(10) Patent No.: US 7,430,172 B2
(45) Date of Patent: Sep. 30, 2008

(54) METHOD FOR ALLOCATING TRANSMISSION BANDWIDTH IN A PACKET-ORIENTED COMMUNICATIONS FACILITY

(75) Inventors: Stephan Brandenburg, Germering (DE); Thomas Treyer, München (DE); Oliver Veits, Dachau (DE)

(73) Assignee: Siemens Aktiengesellschaft, Munich (DE)

(*) Notice: Subject to any disclaimer, the term of this patent is extended or adjusted under 35 U.S.C. 154(b) by 364 days.

(21) Appl. No.: 10/545,550

(22) PCT Filed: Jan. 23, 2004

(86) PCT No.: PCT/EP2004/000578

§ 371 (c)(1),
(2), (4) Date: Aug. 12, 2005

(87) PCT Pub. No.: WO2004/073265

PCT Pub. Date: Aug. 26, 2004

(65) Prior Publication Data

US 2006/0077904 A1    Apr. 13, 2006

(30) Foreign Application Priority Data

Feb. 14, 2003   (DE) ................................. 103 06 293

(51) Int. Cl.
H04L 12/26    (2006.01)
(52) U.S. Cl. .................................... 370/235; 370/468
(58) Field of Classification Search ............ 370/253, 370/229, 235, 428, 231, 230.1, 412, 235.1, 370/413, 468
See application file for complete search history.

(56) References Cited

U.S. PATENT DOCUMENTS

| 6,192,032 B1 * | 2/2001 | Izquierdo ................. 370/230 |
| 6,247,061 B1 * | 6/2001 | Douceur et al. ............ 709/240 |
| 6,373,824 B1 | 4/2002 | Tang et al. |
| 6,522,628 B1 * | 2/2003 | Patel et al. ............... 370/230.1 |
| 6,801,500 B1 * | 10/2004 | Chandran ................ 370/230.1 |

(Continued)

OTHER PUBLICATIONS

Girish Chiruvolu and Saravut Charcranoon, "An Efficient Edge-based Congestion Management for a Differentiated Services Domain", Computer Communications Networks, Proceedings of Ninth International Conference in Las Vegas, NV, USA, Oct. 16-18, 2000, Piscataway, NJ, USA, IEEE, Oct. 16, 2000, pp. 75-80, SP010524490.

(Continued)

Primary Examiner—Aung S. Moe
Assistant Examiner—Kenan Cehic
(74) Attorney, Agent, or Firm—Bell, Boyd & Lloyd LLP

(57) ABSTRACT

The packet-oriented communications facility comprises at least one token-bucket unit, which comprises a time-bucket unit and of a byte-credit unit. Data volume tokens, which each represent a predetermined data volume, are stored in the byte-credit unit. A token generation time interval and a token generation time are assigned to the time-bucket unit. In addition, a processing time is assigned to each data packet before the subsequent processing. In the time-bucket unit, the transmission time interval available for the subsequent processing of a data packet is determined, and a portion of the available transmission time interval is converted into data volume tokens solely in the event that the token generation time interval is exceeded by the determined available transmission time interval. The generated data volume tokens are stored in the byte-credit unit, and the token generation time is updated. The data volume required for subsequently processing the data packet is subsequently allocated in such a manner that the number of data volume tokens of the byte-credit unit corresponding to data volume are removed.

19 Claims, 3 Drawing Sheets

U.S. PATENT DOCUMENTS

| | | | | |
|---|---|---|---|---|
| 6,862,265 | B1* | 3/2005 | Appala et al. | 370/235 |
| 6,925,055 | B1* | 8/2005 | Erimli et al. | 370/229 |
| 6,950,395 | B1* | 9/2005 | Bashandy et al. | 370/230.1 |
| 7,126,913 | B1* | 10/2006 | Patel et al. | 370/230.1 |
| 7,184,404 | B2* | 2/2007 | Yen et al. | 370/235.1 |
| 7,280,477 | B2* | 10/2007 | Jeffries et al. | 370/235 |
| 2004/0062259 | A1* | 4/2004 | Jeffries et al. | 370/412 |
| 2004/0071166 | A1* | 4/2004 | Yen et al. | 370/472 |
| 2004/0221032 | A1* | 11/2004 | Bernstein et al. | 709/224 |
| 2005/0120102 | A1* | 6/2005 | Gandhi et al. | 709/223 |

OTHER PUBLICATIONS

Chuck Semeria, "Internet Processor II ASIC: Rate-limiting and Traffic-policing Features", White Paper, Juniper Networks, Sunnyvale, CA, USA, 2000, pp. 1-27.

Daniel Chonghwan Lee, "Effects of Leaky Bucket Parameters on the Average Queueing Delay: Worst Case Analysis", Proceedings of IEEE INFOCOM '94, Jun. 12-16, 1994, Toronto, Ontario, Canada, vol. 2, pp. 482-489.

* cited by examiner

METHOD FOR ALLOCATING TRANSMISSION BANDWIDTH IN A PACKET-ORIENTED COMMUNICATIONS FACILITY

CROSS REFERENCE TO RELATED APPLICATIONS

This application is the US National Stage of International Application No. PCT/EP2004/000578, filed Jan. 23, 2004 and claims the benefit thereof. The International Application claims the benefits of German application No. 10306293.9, filed Feb. 14, 2003, both applications are incorporated by reference herein in their entirety.

FIELD OF INVENTION

The invention relates to a method for allocating transmission bandwidth in a packet-oriented communications facility.

SUMMARY OF THE INVENTION

In packet-oriented communications systems data packets are transmitted with different priorities, with network operators having the ability to control the volume of data transmitted as well as the transmission rate within the packet-oriented communications facility. To do this it is necessary to ensure that customers are given assured transmission bandwidth over the long term. In such cases there are various known methods of transmission bandwidth allocation and limiting with the aid of which an assured transmission bandwidth can be monitored. These include use of the "traffic shaping" method for controlling the subsequent processing of data packets in packet-oriented communications facilities, which allows network overloads to be avoided. In principle two basic traffic shaping methods are known:

The leaky bucket method, with the aid of which transmission peaks ("bursts") of the relevant data packet stream are eliminated and the transmission rate is thus kept below an upper limit.

The token bucket method, with the aid of which the view of the average transmission bandwidth is regulated over the long term, with data bursts which are well in excess of the average transmission bandwidth being allowed.

The White Paper "Internet Processor II ASIC: Rate-limiting and Traffic-policing Features" from Juniper Networks, Inc., 2000, describes both the leaky-bucket method and also the token bucket method. With the token bucket bandwidth limitation method a token generator is used to permanently generate data volume tokens or short tokens at a constant rate and to store these in a token bucket unit, with the number of data volume tokens stored here corresponding to a defined allocatable data volume. Each of these data volume tokens allows a regulation unit to control the transmission of a defined number of data bytes. Provided the token-bucket unit features the required number of data volume tokens, data packets of different lengths can be subsequently processed. To transmit a data packet with of a length of 8 data volume tokens for example a data volume of 8 data volume tokens is to be taken by the regulation unit from the token-bucket unit. On overflow of the token-bucket unit, i.e. if the token generator generates more tokens than can be stored in the token-bucket unit, the superfluous data volume tokens generated are discarded. The maximum capacity for accepting data volume tokens defines the length of the data burst that can be processed by the token-bucket unit.

A bandwidth limiter implemented in accordance with the token bucket method takes account of various factors in the subsequent processing of data packets. One of the factors is for example the number of data bytes of a data packet. For successful subsequent processing of this data packet, with a length of P data volume tokens for example, it is necessary for the number of data volume tokens corresponding to the length of the data packet to be forwarded and thus the corresponding transmission bandwidth to be available in the token-bucket unit. For the subsequent processing of these data packets the corresponding number of data volume tokens is taken out of the token-bucket unit and the "occupancy" of the token-bucket unit thereby reduced by P data volume tokens. In the case in which the token-bucket unit does not have any data volume tokens or does not have sufficient data volume tokens required for subsequent processing, the data packet is buffered in a memory unit until such time as the further data volume tokens generated by the token generator unit are sufficient to provide the required transmission bandwidth.

The transmission bandwidth to be monitored by the token bucket method is defined in this case by the constant rate of generation of data volume tokens set in the token generator.

The technical implementation of a bandwidth limiter based on the token-bucket method requires, especially for a number of different transmission bandwidth-monitoring bandwidth limiters, a high outlay in hardware and computing since a constant rate of data volume tokens has to be permanently generated. This necessitates extensive, cost-intensive computing resources or the corresponding hardware units.

The object of the present invention can be seen as specifying an innovative method for transmission bandwidth allocation in a packet-oriented communications facility which can be realized with a reduced technical computing overhead.

The object is achieved by the claims.

The major advantage of the method in accordance with the invention for transmission bandwidth allocation lies in the fact that, in a packet-oriented communications facility, featuring at least one token-bucket unit consisting of a time-token-bucket unit and a byte credit unit, a data volume token representing a defined data volume is stored in the byte credit unit in each case. In this case the time-bucket unit is assigned a token generation time interval and a token generation time. In addition each data packet is assigned a processing time before subsequent processing and in the time-bucket unit the transmission time interval available for subsequent processing of a data packet is determined. Only if the token generation time interval is exceeded by the available transmission time interval determined is a part of the available transmission time interval converted into data volume tokens, these tokens stored in the byte-credit unit and the token generation time updated. Finally the data volume required for the subsequent processing of the data packets is allocated in such a way that the number of data volume tokens corresponding to the data volume is taken from the byte-credit unit.

The difference between the processing time and the token generation time in this case particularly advantageously defines the available transmission time interval or the occupancy level of the time-bucket unit relevant to the subsequent processing of the data packets.

Furthermore a token generation time interval is defined for the time-bucket unit which is assigned to a corresponding number of data volume tokens on the byte-credit unit side, which defines the desired transmission bandwidth. Only if there are not sufficient data volume tokens in the byte-credit unit for the current data packets to be processed and if at the same time the available transmission time interval is greater than the token generation time interval is a part of the available transmission time interval of the size of the token generation time interval converted into the corresponding volume of data volume tokens, this part stored in the byte-credit unit and also the token generation time updated in accordance with the time interval taken. Depending on the values selected for token generation time interval and the corresponding volume of data volume tokens, this step can also be executed a number of times. Thus a check is made particularly advantageously in the time-bucket unit using the computed time differences, as to whether the token-bucket unit or the byte-credit unit needs to be filled up for subsequent processing of the data packets. Subsequently the data volume required for subsequent processing of a data packet is allocated via the byte-credit unit. In this case the allocation of the actual data volume is separated on the basis of the data volume token from the determination of the available transmission time interval on the basis of the time-bucket unit. Advantageously further data volume tokens are generated exclusively if the token generation time interval is exceeded by the available transmission time interval, i.e. the as yet "unused" transmission time of a connection with a fixed assigned transmission bandwidth is determined and converted into an allocatable data volume in the form of data volume tokens. This in its turn is allocated for the subsequent processing of the relevant data packets. This means that the computing resources within the packet-oriented communications facility are exclusively only occupied by the computing operations involved in filling up the token-bucket unit or the byte-credit unit if subsequent processing of one or more data packets requires this. This allows resource-saving processing of data packets from different data connections with different transmission bit rates.

Advantageously the available transmission time interval is determined by forming the time difference between processing time and token generation time. This enables the allocation of a predetermined transmission rate to be realized using simple addition or subtraction operations. This allows the compute-intensive multiplication and division operations to be avoided. For example the permitted size of a data burst is implemented by limiting the available transmission time interval. This is achieved in particular in that, before or after the processing of a data packet, the size of the available transmission time interval is checked to see if a predefined value has been exceeded and subsequently the token generation time is adapted appropriately if necessary.

A further aspect of the invention can be seen in the fact that conversion of a part of the available transmission time interval into data volume tokens updates the token generation time by adding the token generation time interval to the token generation time. The inventive allocation of available transmission time to data volume tokens representing a data volume ensures that in the byte-credit unit the available data volume represented in the time-bucket unit by a transmission time interval is available for allocation to the data packets as part of the subsequent processing.

A further advantage can be seen in the fact that with a number of token bucket units provided in the packet-oriented communications facility, each token-bucket unit is assigned an individual transmission bandwidth token generation time interval. This is particularly advantageous in that it allows each individual token-bucket unit to be assigned an individual maximum transmission bandwidth.

Further advantageous embodiments of the invention are described in the dependent claims.

The invention will be explained below in greater detail with reference to a number of exemplary embodiments with the aid of a block diagram as well as a number of flowcharts.

DETAILED DESCRIPTION OF INVENTION

Figure 1:
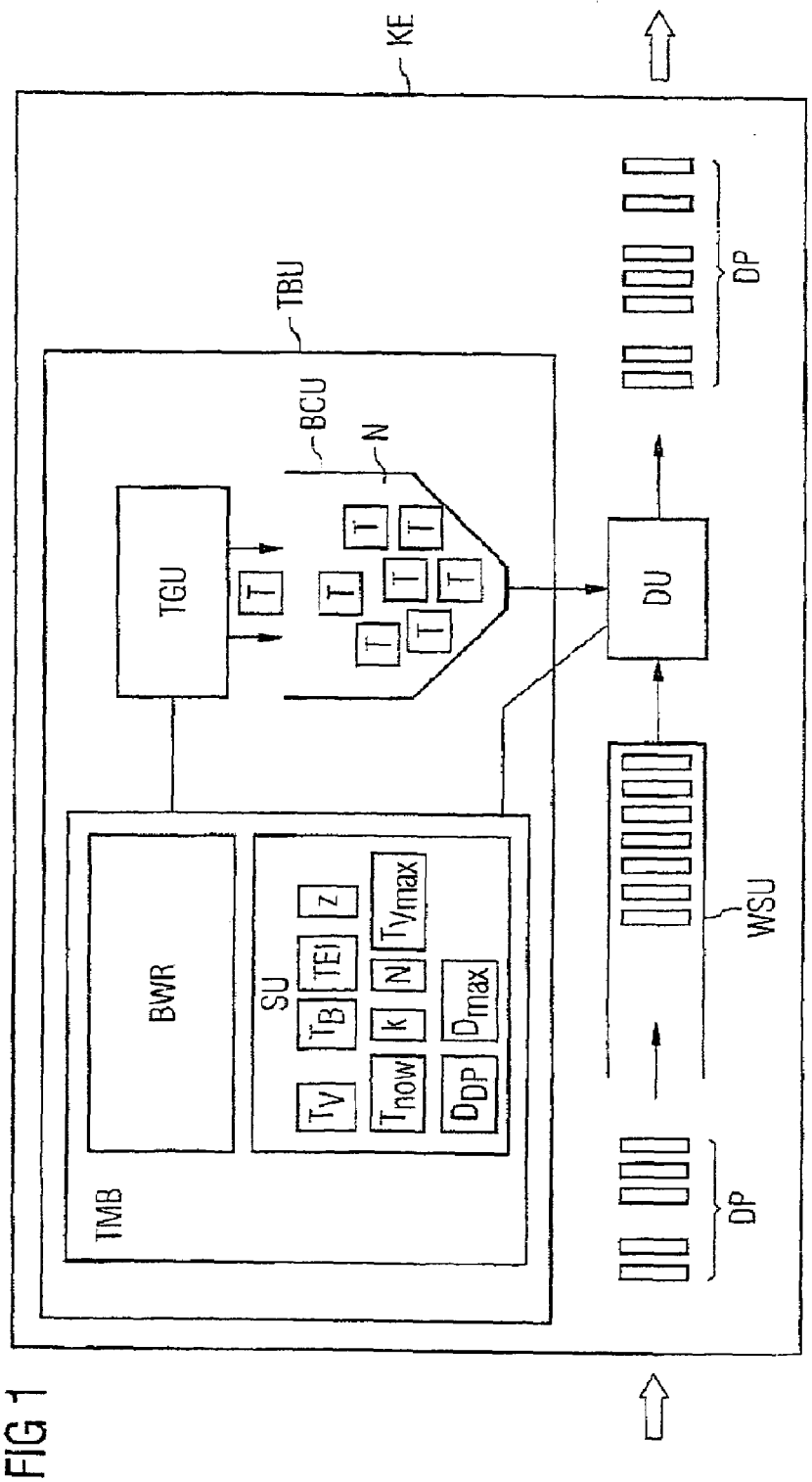
FIG. 1 shows a block diagram of a packet-oriented communication facility, in which the method in accordance with the invention for transmission bandwidth allocation is implemented.

FIG. 1 shows in a block diagram an example of a possible implementation of the method in accordance with the invention for transmission bandwidth allocation in a packet-oriented communications facility KE. FIG. 1 shows a token-bucket unit TBU with a time-bucket unit TMB, a token generation unit TGU, and a byte-credit unit BCU. In addition the packet-oriented communications facility KE typically shows a queue unit WSU as well as a subsequent processing unit DU. An evaluation routine BWR and a memory unit SU area arranged in the time-bucket unit TMB, with the time-bucket unit TMB being connected to the token generation unit TGU and the subsequent processing unit DU. The subsequent processing unit DU is connected to the queue unit WSU as well as to the token-bucket unit TBU or especially the byte-credit unit BCU.

The data packets DP arriving at the communications facility KE are directed in the packet-oriented communications facility KE to the queue unit WSU for example, in which these packets are buffered before being subsequently processed by the subsequent processing unit DU. FIG. 1 typically shows a queue unit WSU. Usually a plurality of such queue units WSU are provided in conventional communications facilities KE, with it also being possible to assign a queue unit to a number of token-bucket units TBU. As an alternative or in addition, one or more queue units WSU can also be provided after the inventive subsequent processing of the data packets DP.

The data packets DP can be different lengths and arrive at different times t in the communication device KE. In addition data packets DP of different connections with different transmission bandwidths can arrive consecutively in the packet-oriented communications facility KE. FIG. 1 shows one typical individual token-bucket unit TBU for a connection for reasons of clarity. For subsequent processing of the data packets DP of different lengths different data volumes $D_{DP}$ are also required, these being provided by the token-bucket unit TBU, especially by the byte-credit unit BCU.

The token-bucket unit TBU, especially the byte-credit unit BCU features a plurality of data volume tokens T each of which represents a defined data volume. In this case the number N of the data volume tokens T contained in the byte-credit unit BCU defines the maximum data volume $D_{max}$ that can be allocated by the byte-credit unit BCU. This type of byte-credit unit can be implemented in different ways, for example with the aid of counter parameter values which are incremented or decremented by a defined value when a data volume token T is added.

The data volume tokens T are generated in the token generation unit TGU—under the control of the time-bucket unit TMB—and forwarded to the byte-credit unit BCU. The forwarding of the data volume token T shown in FIG. 1 is a schematic representation, the technical implementation of which can be based on different embodiments. For allocation of the data volume $D_{DP}$ required for subsequent processing of a data packet DP by the subsequent processing unit DU is—where necessary after the topping up of the byte-credit unit under the control of the time-bucket unit TMB—the number k of data volume tokens corresponding to the data volume $D_{DP}$ is taken from the byte-credit unit BCU.

The transmission bandwidth allocation as well as the filling up of the byte-credit unit BCU with data volume tokens T is controlled by the evaluation routine BWR executed in the time-bucket unit TMB. The parameter values determined or updated by the evaluation routine BWR are stored In the memory unit SU arranged in the time-bucket unit TMB for example. These types of parameter values include the data volume $D_{DP}$ required for subsequent processing of a data packet DP or the number k of volume tokens T corresponding to this, the number N of data volume tokens T currently present in the token-bucket unit TBU, a processing time $T_{now}$ as well as a token generation time $T_B$ and a token generation time interval TEI. The meaning as well as the determination and updating of these parameter values will be explained in greater detail below.

The time-bucket unit TMB is assigned a token generation time interval TEI and a token generation time $T_B$. When this is done the token generation time interval TEI corresponds to the time required for the transmission of a data packet of a defined length for the desired transmission bandwidth. For example this time can correspond to the time required for the transmission of a data packet with the maximum processable length. The token generation time $T_B$, together with the processing time $T_{now}$ defines the occupancy level of the time bucket unit TMB relevant for the subsequent processing of the data packet DP which is referred to below as the transmission time interval $T_V$. The token generation time $T_B$ is updated accordingly each time that a data volume token T is generated in the token generation unit TGU. The token generation time $T_B$ together with the token generation time interval TEI is stored in the memory unit SU of the time-bucket unit TMB.

Figure 2:
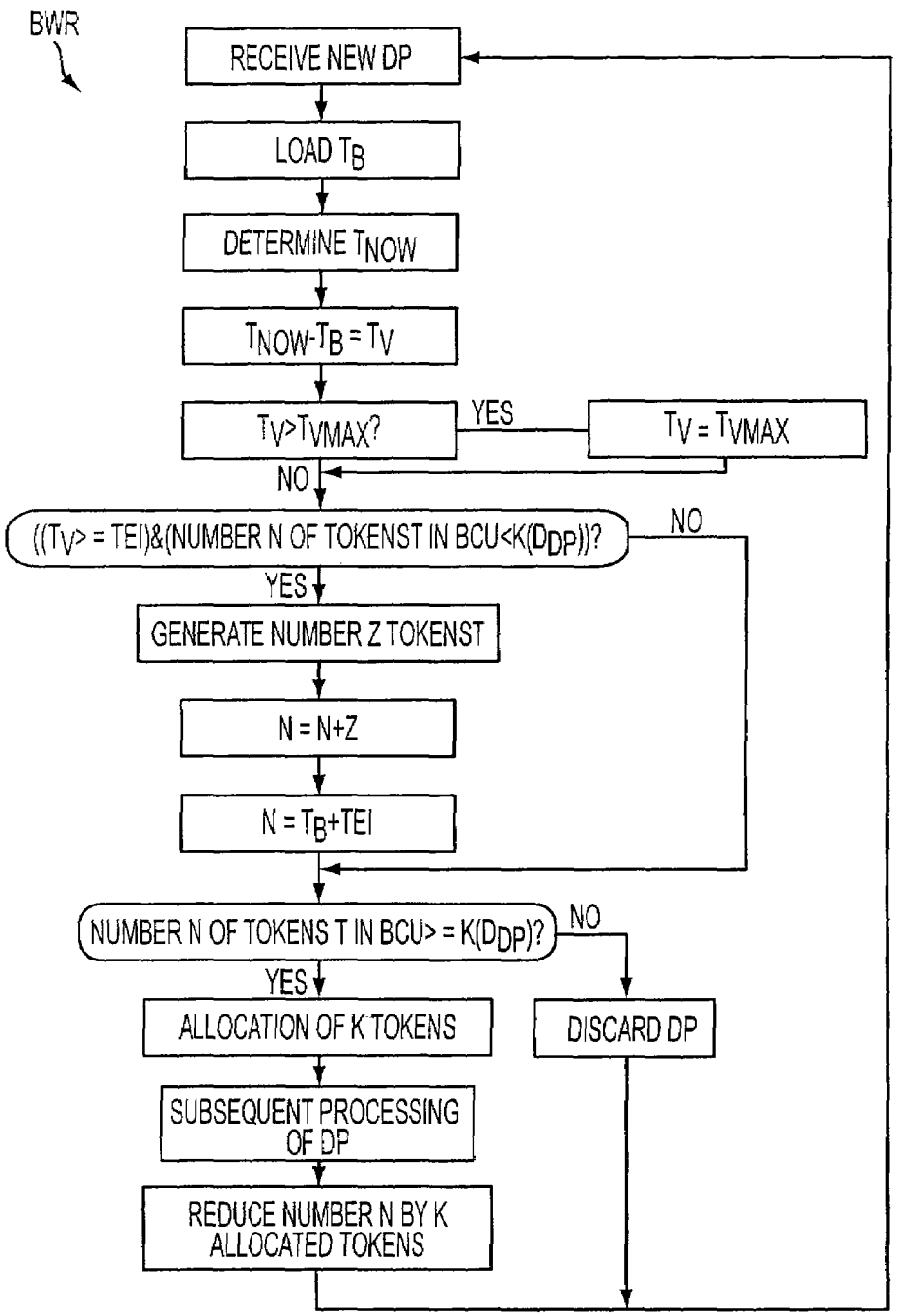
FIG. 2 shows a flowchart of the implementation of the method in accordance with the invention with the aid of an evaluation routine, and FIG. 3a/b shows a diagram of the typical subsequent processing of data packets arriving at different times.

The execution sequence of the method for transmission bandwidth allocation is explained by the example in FIG. 2 with reference to a schematic flowchart. On arrival of a data packet DP in the packet-oriented communications facility KE the token generation time $T_B$ stored in the memory unit SU is loaded by the evaluation routine BWR executed in the time-bucket unit TMB. Furthermore the processing time $T_{now}$ is determined by the evaluation routine BWR. The processing time $T_{now}$ is for example determined, on arrival of a new data packet DP, by the current value of the system time t being automatically assigned by the evaluation routine BWR to the processing time $T_{now}$.

The processing time $T_{now}$ determined for the data packet DP to be processed is compared with the token generation time $T_B$ and in this way the available transmission time interval $T_V$ is determined. In FIG. 2 for example, to determine the available transmission time interval $T_V$ the token generation time $T_B$ is subtracted from the processing time $T_{now}$ determined. The available transmission time interval $T_V$ is compared with an individually defined maximum transmission time interval $T_{max}$ and, if the maximum value $T_{max}$ is exceeded by the available transmission time interval $T_V$ this is assigned the maximum value $T_{max}$. The limitation of the transmission time interval $T_V$ is used to limit the maximum data burst volume. Alternatively the limitation can also be undertaken at another point in the procedure.

Subsequently a check is made as to whether the byte-credit unit BCU has a sufficiently large number N of data volume tokens T in order to subsequently process the data packet DP to be processed. Only if this is not the case is a check made to see whether the available transmission time interval $T_V$ has exceeded the token generation time interval TEI. If the available transmission time interval $T_V$ exceeds the token generation time interval TEI, a conversion of available transmission time into data volume tokens T within the allocatable transmission bandwidth is possible and a filling up of the byte-credit unit BCU before the subsequent processing of the data packet DP is required. To this end a defined number z of data volume tokens T is generated in the token generation unit TGU and loaded into the byte-credit unit BCU. The occupancy level or the number N of the data volume tokens T present in the byte-credit unit BCU is then updated and stored in the memory unit SU. The number z is selected here such that the number of data volume tokens T is sufficient to subsequently process a data packet DP with the maximum permitted data packet length. Alternatively (not shown in FIG. 1-3) z can also be selected as a smaller number, in which case the byte-credit unit BCU will be filled up a number of times if necessary.

In accordance with FIG. 2 the token generation time $T_B$ is additionally updated. To do this for example the token generation time interval TEI is added proportionally to the token generation time $T_B$ and an updated token generation time $T^*_B$ is hereby determined which is used in the processing of the subsequent data packets DP as the token generation time $T_B$.

Subsequently a check is made in accordance with the evaluation routine BWR as to whether the number N of data volume tokens T available in the byte-credit unit BCU is sufficient for the subsequent processing of the data packet DP. To do this the number N of data volume tokens available in the token-bucket unit TBU is compared with the data volume $D_{DP}$ required for subsequent processing of the data packet or with the number k of data volume tokens T required for subsequent processing and, depending on the result of the comparison, the data packet DP is discarded (or alternatively left in the queue unit WSU) or the required data volume $D_{DP}$ is allocated. If the available number N of data volume tokens T exceeds the required number k of data volume tokens T for the allocation of the data volume $D_{DP}$, then in the next step the number N of data volume tokens T available in the token-bucket unit TBU is reduced by the number k and the data volume $D_{DP}$ is allocated in this way. The processed data packet DP is directed to the output of the packet-oriented communications facility KE. If the available number N of data volume tokens T falls below the threshold, i.e. number N<number k, the data packet DP is discarded or alternatively subsequently processed in a different way.

Figure 3A:
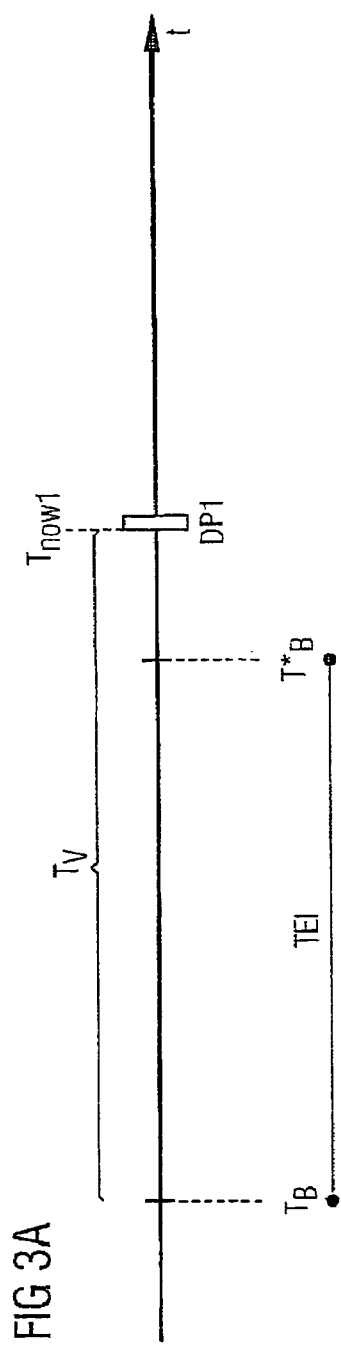

In FIG. 3a, b two diagrams show the typical subsequent processing of two data packets DP1, DP2 with two different processing times $T_{now1}$, $T_{now2}$ in the packet-oriented communications facility KE. To this end the first and second processing time $T_{now1}$, $T_{now2}$ of the first and second data packet DP1, DP2 are each assigned the associated value of the system time t. In the diagrams the progress of the system time t is represented as a straight line in each case on which the processing time $T_{now1}$, $T_{now2}$ of the first or second data packet DP1,DP2 as well as the token generation time $T_B$, of the updated token generation time $T^*_B$ and the token generation time interval TEI are plotted. For the transmission of the first and second data packets DP1,DP2 is a first and second data volume $D_{DP1}$, $D_{DP2}$ is required. For this a first and second number k1, k2 of data volume tokens T is to be allocated.

According to FIG. 3A, in the course of the processing of the first data packet $D_{DP1}$—as can be seen from the evaluation routine BWR shown in FIG. 2 and as has been explained previously—the token generation time $T_B$ is loaded from the memory unit CU of the time-bucket unit TMB. Further the first processing time $T_{now}$ is compared with the loaded token generation time $T_B$ and the available transmission time interval $T_V$ thus determined. In the case shown the available transmission time interval $T_V$ exceeds the token generation time interval TEI so that the generation of further data volume tokens T. i.e. a "filling up" of the byte-credit unit BCU is possible. It is assumed in this case that the byte-credit unit BCU does not contain sufficient data volume tokens T and that thus further data volume tokens K must be generated to fill it up. This is done in accordance with the flowchart in FIG. 2 and an updated token generation time $T^*_B$ thus determined.

After the filling up of the byte-credit unit BCU the first data packet DP1 is allocated the first data volume $D_{DP1}$ required for its transmission in the form of the first number k1 of data volume tokens T. The number N of the data volume tokens T available in the byte-credit unit BCU is subsequently updated, i.e. reduced by the allocated first number k1 of data volume tokens T, and the updated number N is stored in the memory unit CU.

Figure 3B:
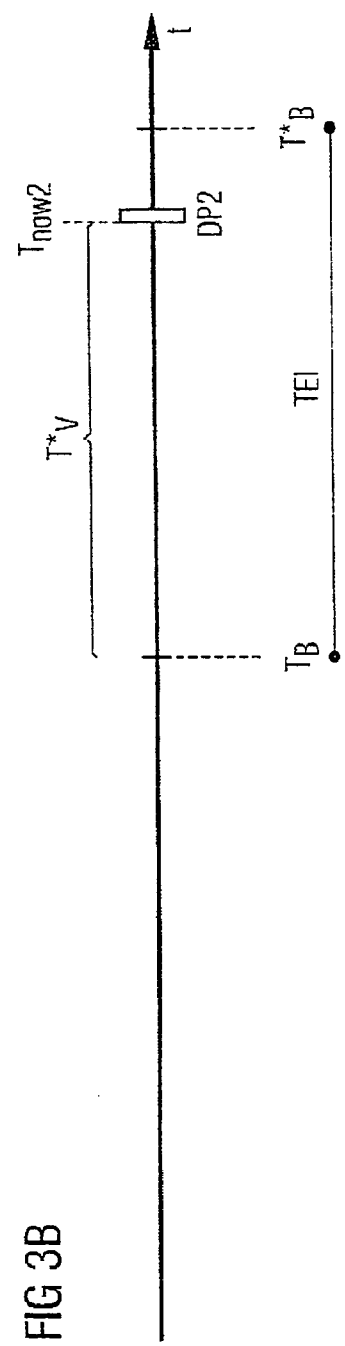

According to FIG. 3B the second data packet DP2 is processed chronologically after the first data packet DP1 in the packet-oriented communications facility KE, so that this is allocated a second processing time $T_{now2}$ which for example is proportionally greater than the first processing time point $T_{now1}$. In accordance with the evaluation routine BWR shown in FIG. 2, for the subsequent processing of the second data packet DP2 an associated token generation time $T_B$ is again initially loaded from the memory unit SU of the time-bucket unit TMB and determined from the time difference between the second processing time $T_{now2}$ and the associated token generation time $T_B$. The time difference determined again corresponds to the transmission time interval $T^*_V$ available in the time-token-bucket unit TMB. The available transmission time interval $T^*_V$ determined in this way is compared with the token generation time interval TEI.

Because of processing undertaken shortly beforehand, the token generation time interval TEI exceeds in FIG. 3B the available transmission time interval $T^*_V$, i.e. the byte-credit unit BCU may not be filled up. If however the data volume $D_{DP}$ is available to the byte-credit unit BCU in the form of sufficient data volume tokens T, then the second data packet DP2 is subsequently processed. To this end the required number k of data volume tokens T is taken from the byte-credit unit BCU and the second bandwidth $D_{DP2}$ is allocated. Subsequently the number N of the data volume tokens T available in the byte-credit unit BCU is updated in its turn and is also stored in the memory unit CU.

The allocation of data volumes $D_{DP}$ with the aid of the byte-credit unit BCU is in no way restricted to the granularity "byte" but the granularities which make sense for the relevant application, for example "Bit" or "XBits" can be used.

In addition, in a packet-oriented communications facility KE a number of token-bucket units (TBU) can be provided, to which at least one individual transmission bandwidth token generation time interval TEI and one token generation time $T_B$ will be allocated in each case. This the method described is suitable for transmission bandwidth allocation of data connections featuring a number of different transmission rates, with for each connection a set of parameters consisting at least of the relevant token generation time interval TEI and the relevant token generation time $T_B$ being provided, which will be evaluated and updated with the aid of the evaluation routine BWR.

The length of the token generation time interval TEI is for example selected such that the length of the token generation time interval TEI corresponds to length of the transmission time interval $T_{vmax}$ required for the processing of a data packet DP corresponding to the maximum allocatable data volume $D_{max}$, i.e. the token generation time interval TEI corresponds to the number of data volume tokens T required for the subsequent processing of a data packet DP having the maximum packet length. The size of the token generation time interval can be defined for individual connections. A typical value for this, with provision for a bandwidth restriction of 20 Mbit/s and a maximum packet length of 1600 bytes for example at 640 µs [(1600 bytes*8 bit/byte)/20 000 000 bit/s].

The invention claimed is:

1. A method for allocating a transmission bandwidth in a packet-oriented communications facility having a token-bucket unit comprising a time-bucket unit and a byte-credit unit, wherein a data volume token representing a defined data volume is stored in the byte-credit unit, the method comprising:

assigning a token generation time interval and a token generation point of time to the time-bucket unit;

assigning a processing point of time to each data packet before a subsequent processing of the data packets;

determining a transmission time interval available in the time-bucket unit for the subsequent processing of each data packet;

if the token generation time interval is exceeded by the by one of available transmission time intervals: Adding a defined number of data volume tokens to the number of data volume tokens in the byte-credit unit and updating the token generation point of time only; and if the available transmission time interval is exceeded by the token generation time interval and if the available number of data volume tokens exceeds a required number of data volume tokens for a subsequent processing of a current data packet: Reducing the number of data volume tokens stored in the byte-credit unit by the required number of data volume tokens corresponding to a data volume of said current data packet or if the number of data volume tokens stored in the byte-credit unit is below the data volume required for subsequent processing of said current data packet: Said data packet is not subsequently processed or is processed in a different way or discarded.

2. The method according to claim 1, wherein the available transmission time interval is determined from a time difference between the processing point of time and an associated token generation point of time.

3. The method according to claim 1, wherein a currently allocatable data volume is determined from the number of data volume tokens stored in the byte-credit unit.

4. The method according to claim 2, wherein a currently allocatable data volume is determined from the number of data volume tokens stored in the byte-credit.

5. The method according to claim 1, wherein an updating the number of data volume tokens stored in the byte-credit unit by adding the defined number includes updating the token generation point of time by adding the token generation time interval to the token generation point of time.

6. The method according to claim 2, wherein an updating of the data volume tokens stored in the byte-credit unit by adding the defined number includes updating the token generation point of time by adding the token generation time interval to the token generation point of time.

7. The method according to claim 3, wherein an updating of the data volume tokens stored in the byte-credit unit by adding the defined number includes updating the token generation point of time by adding the token generation time interval to the token generation point of time.

8. The method according to claim 1, wherein for updating the Byte-credit unit for subsequent processing of each data packet a corresponding number of data volume tokens is assigned to a part of the available transmission time interval and added to the number of tokens stored in the Byte-credit unit.

9. The method according to claim 8, wherein the updating of the data volume tokens is performed a number of times.

10. The method according to claim 1, wherein the length of the token generation time interval is selected such that the length of the token generation time interval corresponds to the length of the transmission time interval required for processing a data packet having a maximum allocatable data volume.

11. The method according to claim 2, wherein the length of the token generation time interval is selected such that the length of the token generation time interval corresponds to the length of the transmission time interval required for processing a data packet having a maximum allocatable data volume.

12. The method according to claim 1, wherein the number of the data volume tokens stored in the byte-credit unit does not exceed a defined maximum value and does not fall below a defined minimum value.

13. The method according to claim 2, wherein the number of the data volume tokens stored in the byte-credit unit does not exceed a defined maximum value and does not fall below a defined minimum value.

14. The method according to claim 1, wherein a maximum transmission time interval defines the average maximum number of data packets arriving immediately after one another in the communication facility.

15. The method according to claim 1, wherein the packet-oriented communications facility comprises a number of token-bucket units, and an individual transmission bandwidth token generation time interval is assigned to each of the time bucket units.

16. The method according to claim 1, wherein, if the number of tokens stored in the byte-credit unit falls below the token generation time interval, the defined number of data volume tokens is created and added to that number.

17. The method according to claim 16, wherein the defined number of data volume tokens is a fixed number.

18. The method according to claim 17, wherein the fixed number of data volume tokens is defined by the data volume required for the subsequent processing of data packets having a maximum processable packet length.

19. The method according to claim 1, wherein the N-multiple of the token generation time interval is added to the token generation point of time if the token generation time interval exceeds N times the available transmission time, wherein N is the maximum data volume $D_{max}$ that can be allocated by the byte-credit unit.

* * * * *